United States Patent [19]
Goodway et al.

[11] Patent Number: 5,787,051
[45] Date of Patent: Jul. 28, 1998

[54] THREE-DIMENSIONAL SEISMIC ACQUISITION

[75] Inventors: William Nicholas Goodway; Brent Roland Ragan, both of Calgary, Canada

[73] Assignee: PanCanadian Petroleum Limited, Calgary, Canada

[21] Appl. No.: 673,071

[22] Filed: Jul. 1, 1996

[51] Int. Cl.$^6$ .................................................. G01V 1/20
[52] U.S. Cl. ............................................................. 367/56
[58] Field of Search ................................ 367/56, 58, 50, 367/51, 38

[56] References Cited

U.S. PATENT DOCUMENTS

| | | | |
|---|---|---|---|
| 4,933,912 | 6/1990 | Gallagher | 367/56 |
| 5,530,646 | 6/1996 | Schoen | 364/421 |
| 5,530,679 | 6/1996 | Albertin | 367/51 |

FOREIGN PATENT DOCUMENTS 2114621  2/1994  Canada .

OTHER PUBLICATIONS

Daniel A. Ebrom, et al., "Bin Spacing in Land 3–D Seismic Surveys and Horizontal Resoultion in Time Slices", The Leading Edge Jan. 1995, pp. 37–40.
J.M. Galbraith, "Seismic Processing Issues in the Design of 3D Surveys".
Daniel A. Ebrom, et al., "Interpretability and Resoultion in Post–Migration Time–Slices," SA 3.4, pp. 995–998.
Round Table, "Is Coarse the Right course?", Sep. 1995, pp. 989–993.
Norman S. Neidell, Round Table—"Sampling 3–D Seismic Surveys: A Conjecture Favoring Coarser but Higher–Fold Sampling," The Leading Edge, Jul. 1994, pp. 764–768.
S. Sitz "Seismic Trace Interpolation in the F–X Domain", Geophysics, vol. 56, No. 6 (Jun. 1991) pp. 785–794.
Norman M. Cooper, "3–D Design—A Systematic Approach," pp. 1–22.
Gigs DJ Vermeer, "3D Symmetric Sampling in Land Data Acquisition".
J. Bouska, "Cut to the Quick: Investigating the Effects of Reduced Surface Sampling in 3D Data Acquisition".

*Primary Examiner*—Ian J. Lobo
*Attorney, Agent, or Firm*—Emrich & Dithmar

[57] ABSTRACT

A method of three-dimensional seismic acquisition comprising providing a plurality of substantially parallel source/receiver lines, each said source/receiver line comprising a linear array of seismic energy receivers at substantially equally spaced station intervals and a linear array of seismic energy sources located at each second station, adjacent source/receiver lines being spaced apart by two station intervals; initiating a seismic disturbance from one of said sources and receiving seismic energy at receivers disposed symmetrically about said source. Because of single direction coarse bin dimension, there is a requirement to reconstruct a uniform bin size through cooperative wavefield reconstruction in processing. The stacked common gin gathered volume of the near patch geometry of the present invention is so robust with spatially consistent, broadband signal frequencies, that accurate dealiased interpolation can be applied, e.g., by using standard F-X prediction.

4 Claims, 11 Drawing Sheets

THREE-DIMENSIONAL SEISMIC ACQUISITION

This invention relates to an improved method for land three-dimensional (3D) seismic field acquisition. In particular, this invention relates to a seismic method in which the seismic source and receiver lines are arranged in a distribution giving a more even density and symmetrical line dimension that is consistent with the dimensions of the station arrangement.

BACKGROUND OF THE INVENTION

There are number of land three-dimensional (3D) seismic data acquisition techniques in use to provide information relating to sub-surface structures and features. All employ an arrangement of seismic energy sources known either as shots (buried dynamite) or surface sources (e.g. vibroseis air gun) and geophones known as receivers, typically laid out in a rectangular grid or patch of surveyed station positions. Shot detonation produces an acoustic wave that travels into the geological strata below the patch and reflects off sub-surface features which present varying acoustic impedances. The reflected waves are received by the receivers and converted to electrical signals that are recorded and subsequently processed and displayed.

The recordings or traces from each receiver- source pair are typically gathered by what is known as the 3D common bin gathering (CBG) method. The CBG method is based on the fact that a seismic wave travelling from a shot to receiver will reflect off a sub-surface layer at a point that is directly under the geometric midpoint between the shot and receiver, assuming no anomalies in either the layer surrounding or above the point of reflection.

The CBG method involves the recording of a multiplicity (fold) of reflected seismic energy from the same or close to similar position on a sub-surface geological horizon with rock parameter variations to the surrounding rock, giving rise to the reflection boundary contrast. The traces are gathered into common areas or "bins" that are arranged into an areal grid. The individual bin dimensions are a function of half the receiver and/or source station dimensions. The explorationist typically has to make an assessment of the fold required in order to image a given formation against the substantial cost of using a large number of sources and receivers in the grid. It is desirable to obtain the best possible resolution through increased fold using the most economic or efficient number of sources and receivers in the field.

As a result of these source-receiver economics, conventional land 3D seismic techniques routinely use coarse line cross-spreads, that have severe asymmetry between line and station dimensions. Differences between station and line dimensions by factors as much as 4 or 5 are considered acceptable, given other requirements being met, e.g., equal line spacings and largest minimum offset. However, this asymmetry results in aliasing of non-random, source generated surface noise, as well as multiple path reflections that contaminate the primary reflected signal in the common shot, receiver, offset and bin domains. Also, the unconstrained erratic offset and azimuth sampling within and between bins causes statistical problems for pre-stack processing. All these effects distort the image in subtle ways, for example by producing phantom anomalies caused by acquisition footprints. These phantom anomalies can result directly in drilling failure, especially for subtle stratigraphic targets.

In published Canadian patent application No. 2,114,321 Cordsen, there is described a 3D acquisition method which provides greater data processing flexibility to optimize the signal-to noise and resolution. The method involves varying the receiver and source line intervals slightly from the even multiple rule conventionally employed. This will result in an even distribution of theoretical mid-points within each bin permitting post-acquisition "rebinning" of the midpoints to increase the fold. The use of receiver and source line intervals that vary from even multiples provides incremental choices for increasing fold rather than the conventional practice of doubling bin size.

While Cordsen does provide a flexible rebinning method, it utilizes placements of sources and receivers along orthogonal lines utilizing a conventional coarse asymmetrical pattern of source and receiver line dimensions compared to station dimensions within the lines. As a result, the Cordsen method, like the conventional orthogonal crossspread layout, can suffer from erratic irregular sampling giving rise to statistical problems in pre-stack processing. In addition, while Cordsen is effective to evenly scatter the theoretical mid sub-bins within each standard bin for flexibility of fold stacking, there are many cases where the fold in individual sub-bins is simply too low, resulting in absent or weak stacked signal. As a result, in practice, the Cordsen method compensates by summing over a large subsurface area of sub-bins, thereby "smearing" the specific reflected image points resulting in reduced spatial resolution that does not represent the potential true subsurface image.

SUMMARY OF THE INVENTION

The present invention provides a 3D acquisition method which regularizes acquisition spatial sampling to meet resolution objectives through cooperative processing. The result is significant signal to noise improvement and a major reduction of the acquisition footprint, leading to improved reservoir delineation.

Thus, in accordance with the present invention, there is provided a method of three-dimensional seismic acquisition comprising:

(a) providing a plurality of substantially parallel source/ receiver lines, each said source/receiver line comprising a linear array of seismic energy receivers at substantially equally spaced station intervals and a linear array of seismic energy sources located at each second stations adjacent source/receiver lines being spaced apart by two station intervals;

(b) initiating a seismic disturbance from said sources;

(c) receiving seismic energy at receivers disposed about said source.

In accordance with another aspect of the present invention, there is provided a method of three-dimensional seismic acquisition comprising:

(a) providing a plurality of substantially parallel source/ receiver lines, each said source/receiver line comprising a linear array of seismic energy receivers at substantially equally spaced station intervals and a linear array of seismic energy sources located at each second station or at each station, adjacent source/receiver lines being spaced apart by two station intervals;

(b) initiating a seismic disturbance from one of said sources;

(c) receiving seismic energy at receivers disposed about said source reflected from sub-surface bin areas, each bin centred about a common mid-point between said source and one said receiver and having dimensions of one-half by one station intervals;

(d) converting said received energy into electrical signals;

(e) repeating steps (b) to (d) and prestack processing said signals into stacked traces from common bins;

(f) associating said stacked traces from each bin with a smaller bin centred about the common mid-point and having dimensions of one-half by one-half station intervals;

(g) post-stack processing said stacked traces to produce wavefield reconstructed traces and associating said wavefield reconstructed traces with smaller bins with which said stacked traces have not been associated;

(h) displaying said stacked and wavefield reconstructed traces.

In accordance with another aspect of the present invention, the sources within each source/receiver line are located at each second station and in adjacent lines are orthogonally aligned.

In accordance with another aspect of the present invention, the sources within each source/receiver line are located at each second station and in adjacent lines are diagonally staggered by one station interval.

In accordance with another aspect of the present invention, the post-stack processing includes wavefield reconstruction by F-X prediction and threedimensional migration.

DESCRIPTION OF THE PREFERRED EMBODIMENTS

Figure 1:
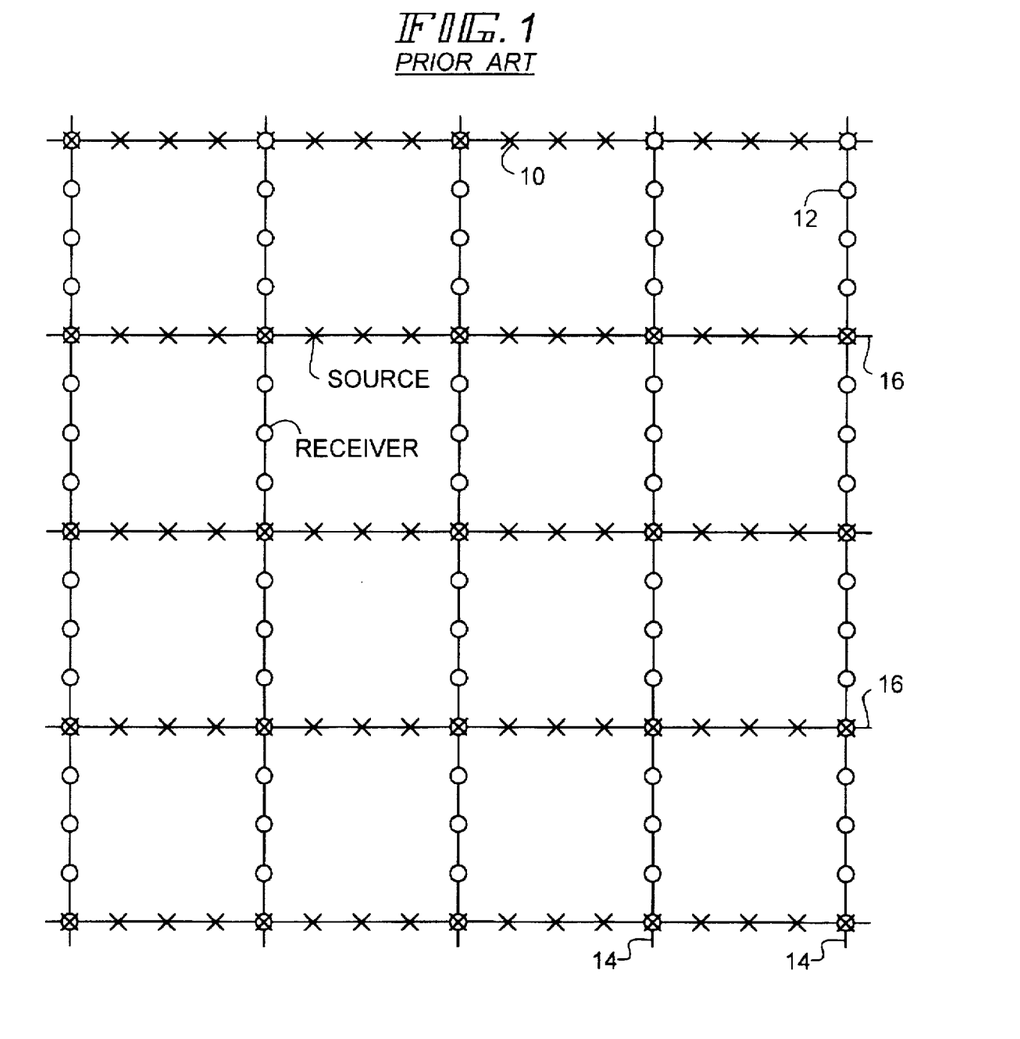
FIG. 1 is a plan representation of a conventional patch geometry of the prior art.

Referring to FIG. 1, an arrangement of sources 10 and receivers 12 as used in conventional orthogonal cross-spread grids is shown. Receivers 12 are uniformly laid out in parallel receiver lines 14 and sources 10 are uniformly laid out in parallel source lines 16 which are orthogonally disposed to receiver lines 14. In accordance with conventional practice, the spacing between lines is typically an even multiple of the between receiver stations. As shown in FIG. 1, the spacing between lines is 4 times the receiver station spacing.

As noted above, the asymmetry between line and station spacing results in aliasing and signal contamination. The benefit in reducing or removing the line/station asymmetry is evident from the 3D fold equation Fold (h)=πh²/4 (Shot line×Rec. line)

where the larger shot or receiver line dimensions impact fold or intra-bin sampling (offset mix) and not the smaller station dimensions.

Figure 2:
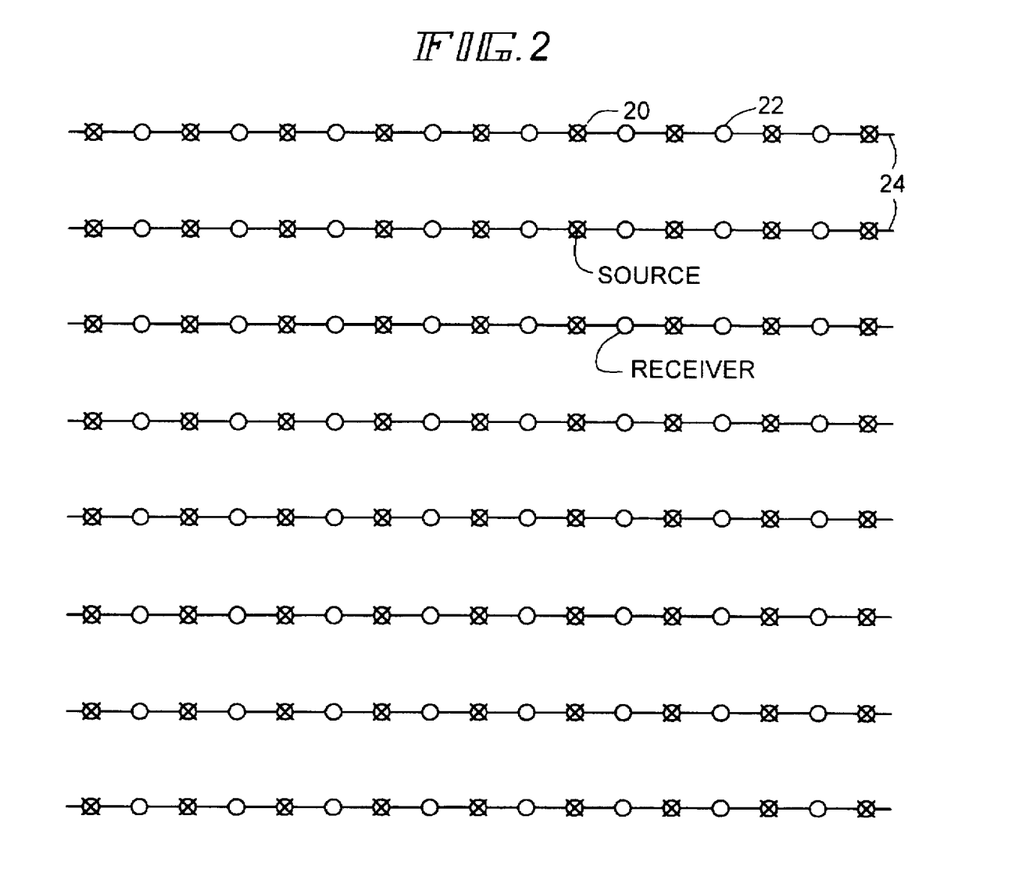
FIG. 2 is a plan representation of the patch geometry of the present invention.

Referring to FIG. 2, an arrangement of sources 20 and receivers 22 in accordance with the present invention is shown. Sources 20 and receivers 22 are laid out in parallel common source/receiver (SR) lines 24. Receivers 22 are laid out along SR lines 24 at single station dimensions. Spacings between adjacent SR lines 24 is at double the receiver station dimensions within SR lines 24. Sources 20 are laid out along SR lines 24 at double the receiver station dimension, but can also be laid out at the single receiver station spacing. The determination of whether the source placement is equal to the receiver single station dimensions placement or at double the receiver station dimension is dependent upon the fold requirement for signal to noise improvement hence resolution and is also a function of cost effectiveness. In addition, where source placement is at double receiver station dimensions, the sources within adjacent source/receiver lines can be orthogonally aligned as shown in FIG. 2, or can be diagonally staggered by one station interval.

As with conventional orthogonal 3D acquisition, an area of receivers is recorded for every shot position. The size of this area is dependent on depth of target (the deeper the target, a larger usable offset distance from the shot position can be used), and other considerations such as multiple path reflections. This area or "patch size" can be expressed by the number of source/receiver lines x number of receivers on each of the lines, in a manner similar to orthogonal layouts. This area is usually square although it is not required to be. The shot position falls in the centre of this area so that information is recorded equally in all directions from it.

The grid layout shown in FIG. 2, as compared conventional 3D orthogonal cross-spread layouts such as that shown in FIG. 1, reduces the asymmetry between the positioning of the source and receiver lines compared to station dimensions within the SR lines. This ensures that the source is always recorded at the centre of the receiver arrangement with the more even and symmetric density distribution of receivers (near patch geometry). This live patch is moved as acquisition progresses along the symmetric source grid dimensions, always maintaining the source at the centre of the live patch. The method of the present invention therefore produces a near symmetric orthogonal receiver patch or area surrounding each source with typical dimensions of one by two receiver stations.

This symmetrical acquisition design significantly reduces the level of noise in the data and results in a better signal to noise ratio and at a very consistent spatial continuity of signal with broadband frequencies. The method of the present invention also enables a reduction of the field acquisition imprint termed "footprint" from the standard asymmetric coarse acquisition line to a finer dimension station spacing.

Figure 3:
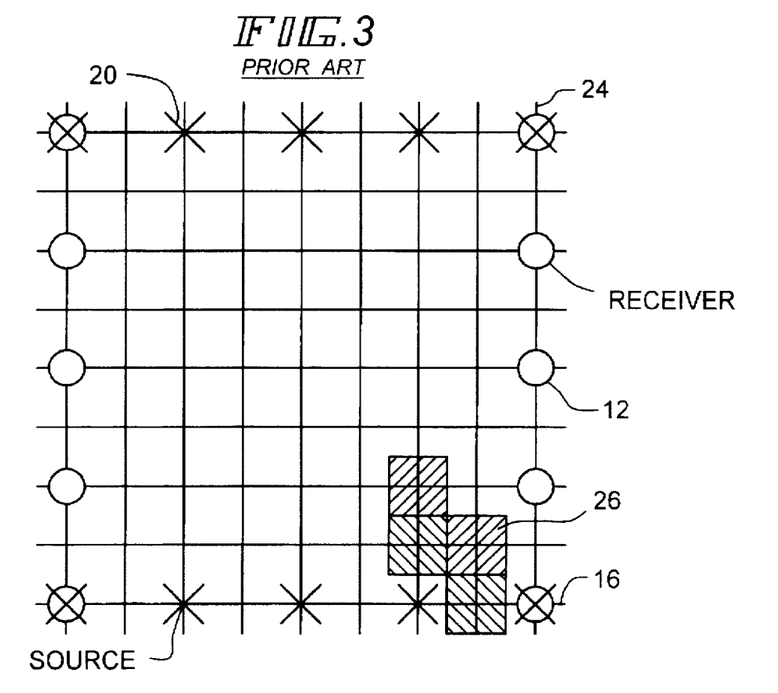
FIG. 3 is an expanded representation of the conventional patch geometry of the prior art showing bin size and location.
Figure 4:
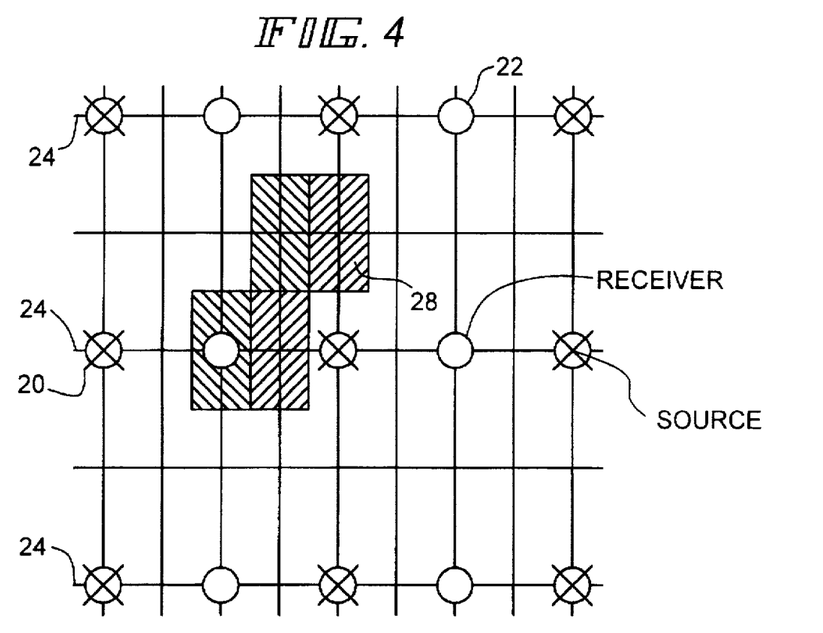
FIG. 4 is an expanded representation of the patch geometry of the present invention showing bin size and location.

FIGS. 3 and 4 provide an enlarged view if the patch geometries of FIGS. 1 and 2 respectively. With the conventional orthogonal layout of FIG. 3, bins 26 are symmetrical in view of the symmetry between source and receiver station dimensions. The spacing between source/receiver lines 24 in the layout of FIG. 4 is typically 120 m as compared to a 60 m in-line station spacing conventionally used in the cross-spread orthogonal layout of FIG. 3. This produces a near symmetric (60 m×120 m) recording patch around each shot and close to equivalent symmetry in shot stations (120 m×120 m). However, there is a dimensional asymmetry in bins 28 which have dimensions of one-half by one station interval due to the fact that the source/receiver line spacing is twice the in-line receiver station spacing. It is preferred that the longest dimension of the bin be oriented in a direction that is least geologically significant.

Figure 5:
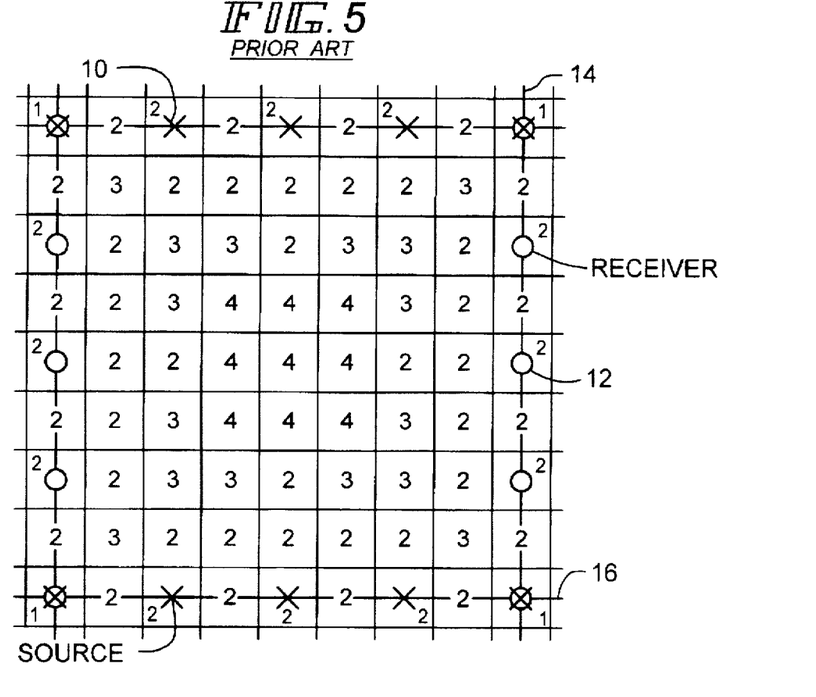
FIG. 5 is an expanded representation of the conventional patch geometry of the prior art showing the bin fold.
Figure 6:
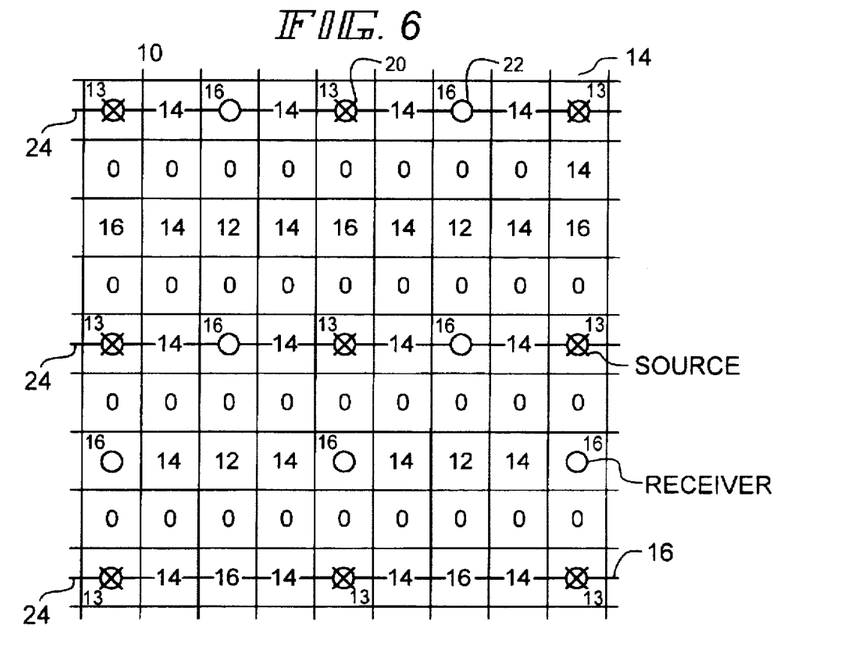
FIG. 6 is an expanded representation of the patch geometry of the present invention showing the bin fold.

FIGS. 5 and 6 provide a representation showing the "bin fold" for patch geometries similar to those of FIGS. 3 and 4 respectively, but with a receiver station spacing of 70 m. Because of single direction coarse bin dimension using the near patch geometry of the present invention, there is a requirement to reconstruct a uniform bin size through cooperative wavefield reconstruction. In the representation of FIG. 6, the bins have been reconfigured into standard square bins having dimensions of one-half by one-half station intervals and the calculated bin fold of the stacked signals from each former rectangular bins has been assigned to the square bin centred over the common mid-point of the former rectangular bin. This produces four rows of bins which are indicated as having "0" fold. In accordance with the present invention, to increase spatial resolution, a non-zero trace from these bins is generated on the resulting post-stack CBG volume through wavefield reconstruction and standard 3D migration imaging. Wavefield reconstruction is also possible pre-stack with modern processing algorithms.

The stacked CBG volume of the near patch geometry of the present invention is so robust with spatially consistent, broadband signal frequencies, that accurate dealiased interpolation can be applied, e.g., by using standard F-X prediction. The advantage of the near patch geometry of the present invention is attributable to the approximately four times increase in fold (as is evident from a comparison of FIGS. 5 and 6) and the regular distribution of offset and azimuth.

Figure 7:
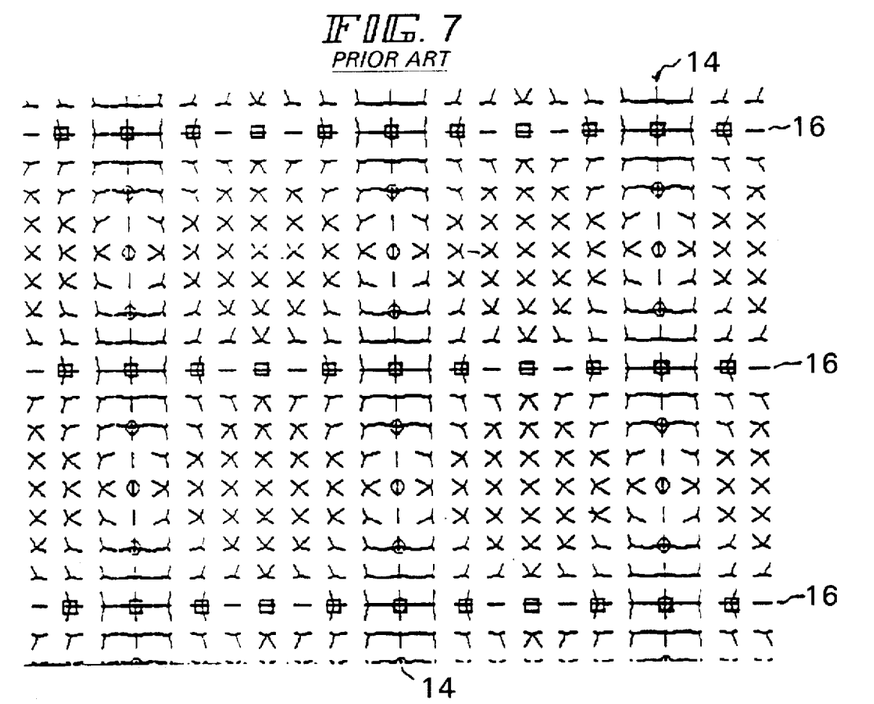
FIG. 7 is a representation of the offsets and azimuths associated with the conventional patch geometry of the prior art.
Figure 8:
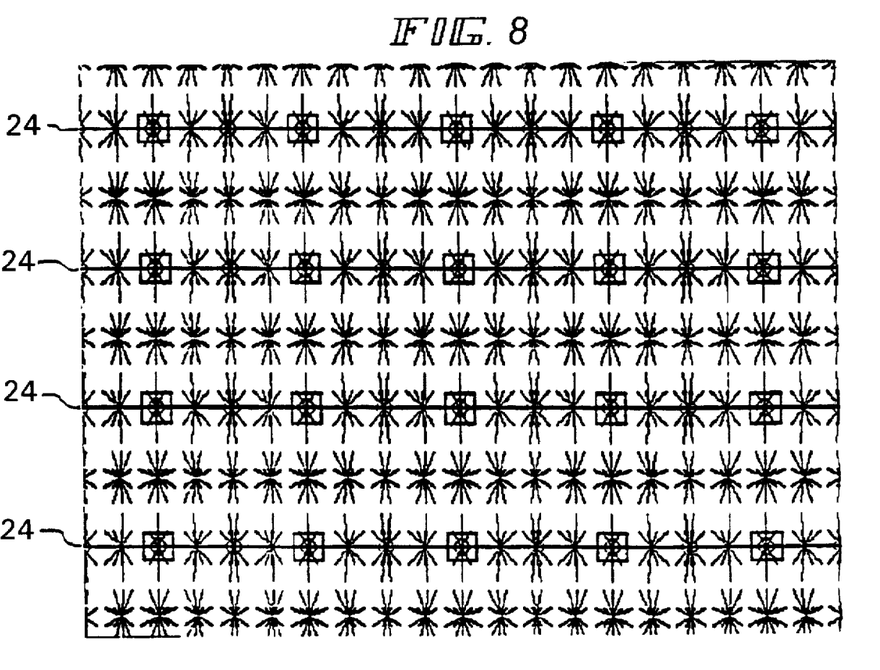
FIG. 8 is a representation of the offsets and azimuths associated with the patch geometry of the present invention.

Referring to FIG. 7, a 0–500 m offset azimuth plot for a conventional 240 m×240 m orthogonal layout having 60 m stations and 30 m bins is shown. The direction of the lead lines from each bin centre shows azimuth while the length of each lead line represents fold. FIG. 8 is a similar representation, but for the patch geometry of the present invention having a 120 m×60 m line spacing and 60 m×30 m bin dimensions. As is evident from FIGS. 7 and 8, the present invention produces a large number of evenly distributed different offsets and different azimuths for each bin which significantly improves noise cancellation thereby generating a robust signal for interpolation. With the conventional layout, far fewer different offsets and azimuths are produced resulting in distorted signal due to lack of noise cancellation.

FX interpolation is described by Spitz in *Seismic trace interpolation in the F-X domain*, Geophysics, Vol. 56, No. 6 (June 1991), pp. 785–794. The requirement for 2:1 FX interpolation is based on the fact that for dips with apparent velocity V=fΔx (f is reference or average frequency, Δx is original bin size) the spatial prediction filter at frequency f hz and bin Δx, is the same as for 2f hz and bin Δx/2, but only if f (avg.) and 2f (maximum) have a similar S/N for the same event. Hence the need for a robust spatially consistent broadband signal, as described by Spitz. Accordingly, the coarse bin size of the layout of FIG. 4 is halved through a combination of interpolation (pre-migration) and 3D migration, for no loss of spatial resolution.

It can also be demonstrated that wavefield reconstruction by pre-stack Kirchoff migration on the standard coarse line cross-spread decimations is unable to achieve the resolution, S/N or continuity of either the "full-patch" or the present invention. Standard cross-spread irregular coarse sampling in the common offset domain generally affects pre-stack migration/dip move out (DMO) by introducing acquisition footprint artifacts, especially amplitude errors. Sampling problems for migration stem from inadequate destructive interference in accurately reconstructing flat or gently dipping reflections as opposed to steep dips which construct easily. This can be envisaged as a Hugyens-Fresnel requirement for adequate wavefield reconstruction needing more than 10 points per Fresnel radius, based on a migration spatial resolution improvement factor of 10:1 (Lindsey J. *The Fresnel Zone and its Interpretive Significance*" TLE, October 1989, pp. 33–39) and is used as a limiting criterion for FX spatial interpolation. Another restriction for wavefield construction is due to the fact that migration is unable to increase spatial wavenumbers. However, with the present invention, the above problems, both pre- and post-stack have the potential for significant improvement, provided that the wavefield reconstruction concepts described above are adhered to.

Maximum interpolated bin dimensions can be established through a careful understanding of vertical and horizontal resolution requirements and objectives, as described for example in Freeland et al., "*What Does Migration Do To Seismic Resolution*" Sept. & Oct. CSEG Recorder and Neidell, "*Sampling 3D Seismic Surveys: A Conjecture Favoring Coarser But Higher-Fold Sampling*" TLE, July 1994, pp. 764-768. The following observations give reasonable limits for bin size based on targets of 1.5 km depth and 3 km/s velocity.

a) Fresnel zone apertures of only 18° contain 70% of diffraction energy, with 95% contained in a 30° aperture (Galbraith, "*Seismic Processing Issues in the Design of 3D Surveys* 1995 CSEG Annual Convention Abstracts, pp. 175-176). This suggests that steep diffraction limbs may not contribute significantly to the migration thereby obviating costly 15 m bin size migration requirements to avoid aliasing.

b) the post migration relationship between minimum horizontal resolution ($\Delta xh$) and minimum vertical resolution ($\Delta xv$) is $\Delta xh = \Delta xv \div \sin \theta$ where $\theta$ is the maximum ray angle in the migration aperture (maximum dip). Hence, for migrated dips up to 25° with $\Delta xv = 17$ m, the minimum horizontal resolution is $\Delta xh = 40$ m, suggesting bin dimensions $\geq 30$ m would be adequate.

c) for dominant frequencies of 50 hz and spatially robust bandwidth up to 100 hz, bin spacings of 35 m adequately image dips up to 30°, assuming a velocity gradient $V(z) = V(0) + 0.8$ z [$V(0) = 1900$ m/s].

EXAMPLE

Figure 9A:
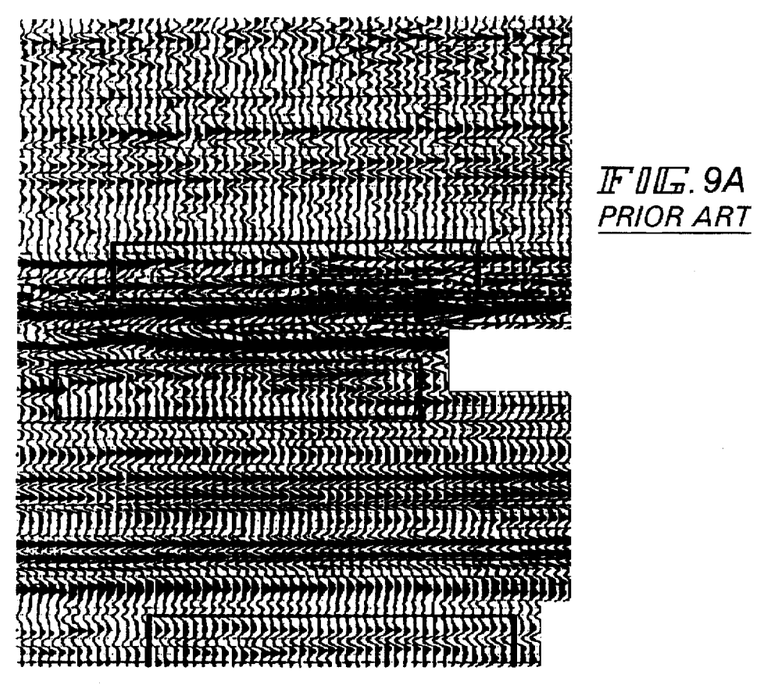
FIG. 9A is a stacked section from the 3D volume produced with the conventional patch geometry of the prior art using standard cross-line spacings of 280 m×280 m.
Figure 9B:
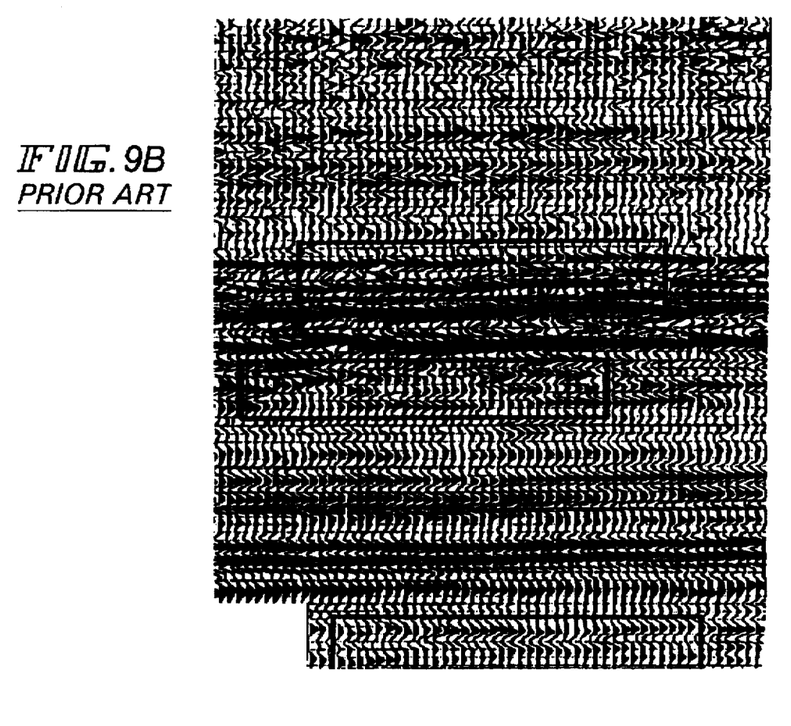
FIG. 9B is a stacked section from the 3D volume produced with the conventional patch geometry of the prior art using standard cross-line spacings of 350 m×350 m.
Figure 10A:
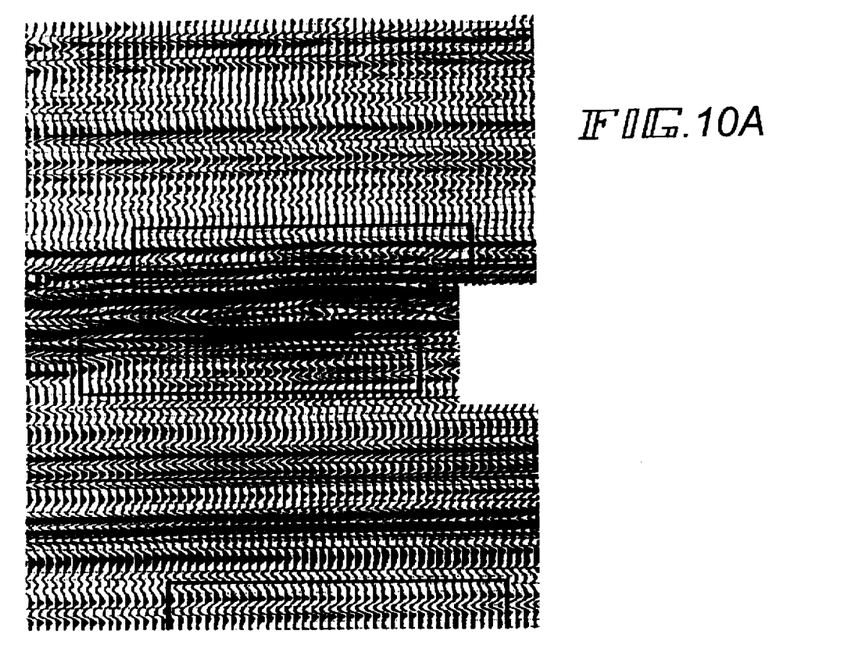
FIG. 10A is a stacked section from the 3D volume produced with a full patch geometry using cross-line spacings of 70 m×70 m for the purpose of comparison.
Figure 10B:
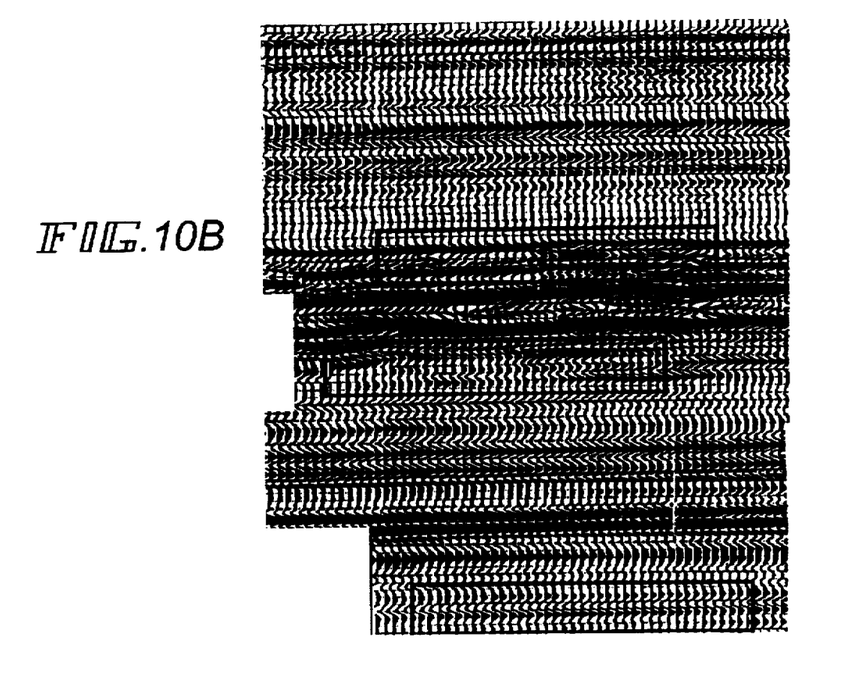
FIG. 10B is a stacked section from the 3D volume produced with the patch geometry of the present invention using a 140 m×70 m grid.

A survey of a sub-surface reservoir was repeated with three different patch geometries. FIG. 9A is a stacked section from the 3D volume produced with the conventional patch geometry of FIG. 1 using standard cross-line spacings of 280 m×280 m. FIG. 9B is a stacked section from the 3D volume produced with the conventional patch geometry of FIG. 1 using standard cross-line spacings of 350 m×350 m. FIG. 10A is, for the purpose of comparison, a stacked section from the 3D volume produced with a full patch geometry using patch grid spacings of 70 m×70 m in which receivers are located at each station and shots are located at 70 m×140 m station spacings. FIG. 10B is a stacked section from the 3D volume produced with the patch geometry of the present invention using a 140 m×70 m grid patch. All signals were optimized with independent and identical processing flows including 3D migration. In addition, the signals from the patch geometry of the present invention were subjected to wavefield reconstruction via FX interpolation as described above.

Referring first to the results of the full patch test as shown in shown in FIG. 10A, a very distinct noise free smooth appearance shows robust consistent spatial resolution. As shown in FIG. 10B, the patch geometry of the present invention exhibits results closely approaching those of the full patch geometry. In contrast, the industry standard coarse line cross-spread results in FIGS. 9A and 9B show spatially aliased noise artifacts and distortion, which have been highlighted in rectangular boxes. The noise artifacts severely distort the interpretation of anomalies. In fact, the industry standard results shown in FIGS. 9A and 9B are so distorted as to be almost useless because the apparently drillable anomalies are true "phantom anomalies" that do not in fact exist. This is evident from an inspection of the identically positioned lower two rectangular boxes in FIGS. 10A and 10B that do not contain anomalies.

Figure 11A:
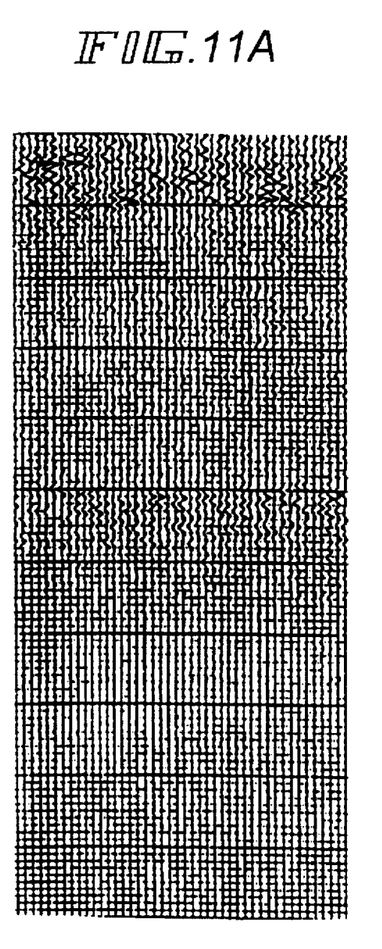
FIG. 11A is a differenced stacked section from the 3D volume produced by subtracting the results obtained by the patch geometry of the present invention using a 140 m×70 m grid from the results obtained by a full patch geometry using cross-line spacings of 70 m×70 m.
Figure 11B:
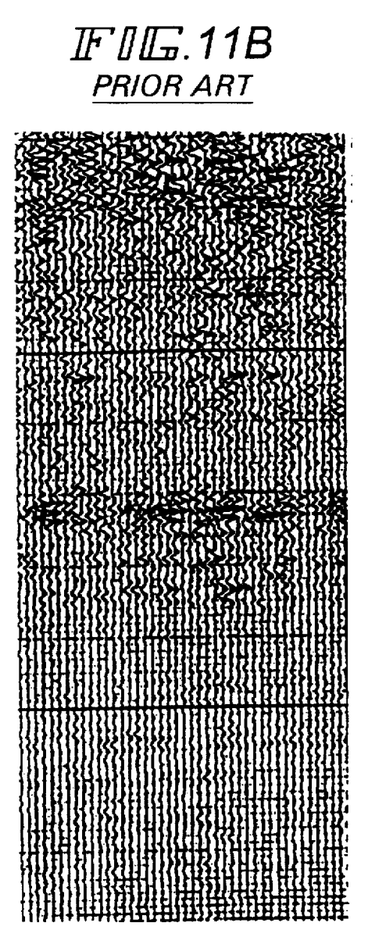
FIG. 11B is a differenced stacked section from the 3D volume produced by subtracting the results obtained by the conventional patch geometry of the prior art using standard cross-line spacings of 240 m×240 m from the results obtained by a full patch geometry using cross-line spacings of 70 m×70 m.

Difference stacks shown in FIGS. 11A and 11B demonstrate how close the wavefield reconstructed results of the present invention come to the full patch results as compared to the results using the industry standard. Significant amplitude distortion can be seen in FIG. 11B for the standard coarse 3D difference stack, while the wavefield reconstructed results in FIG. 11A of the present invention show only minor amplitude variation from the correct, originally densely sampled full patch section.

Figure 12A:
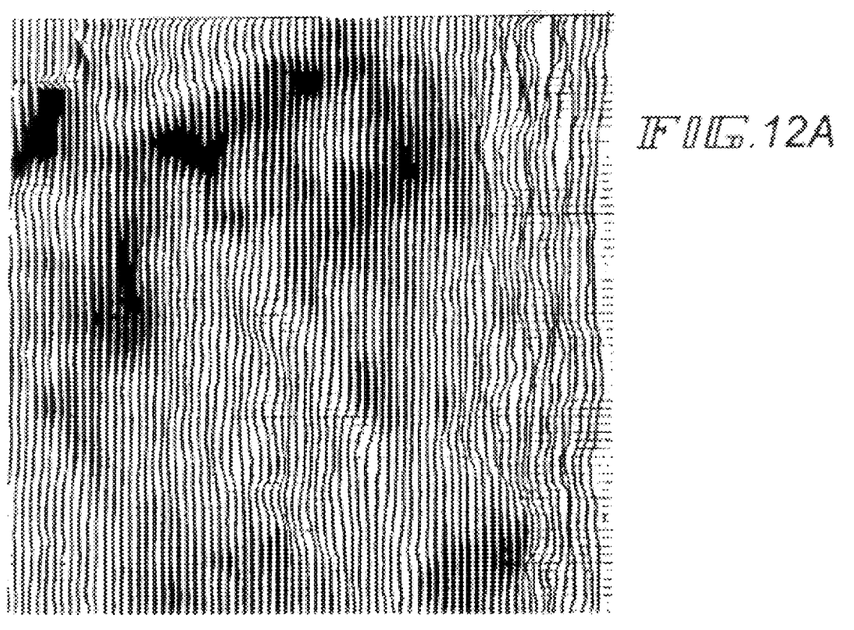
FIG. 12A is a "time slice" of a stacked section from the 3D volume produced with the patch geometry of the present invention using a 140 m×70 m grid.
Figure 12B:
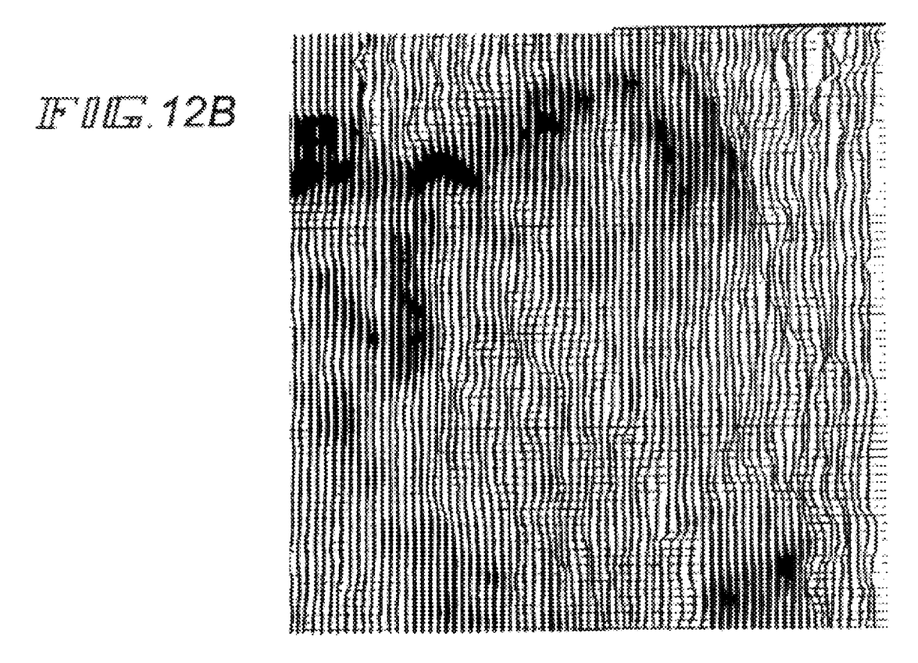
FIG. 12B is a "time slice" of a stacked section from the 3D volume produced with a full patch geometry using cross-line spacings of 70 m×70 m.
Figure 13A:
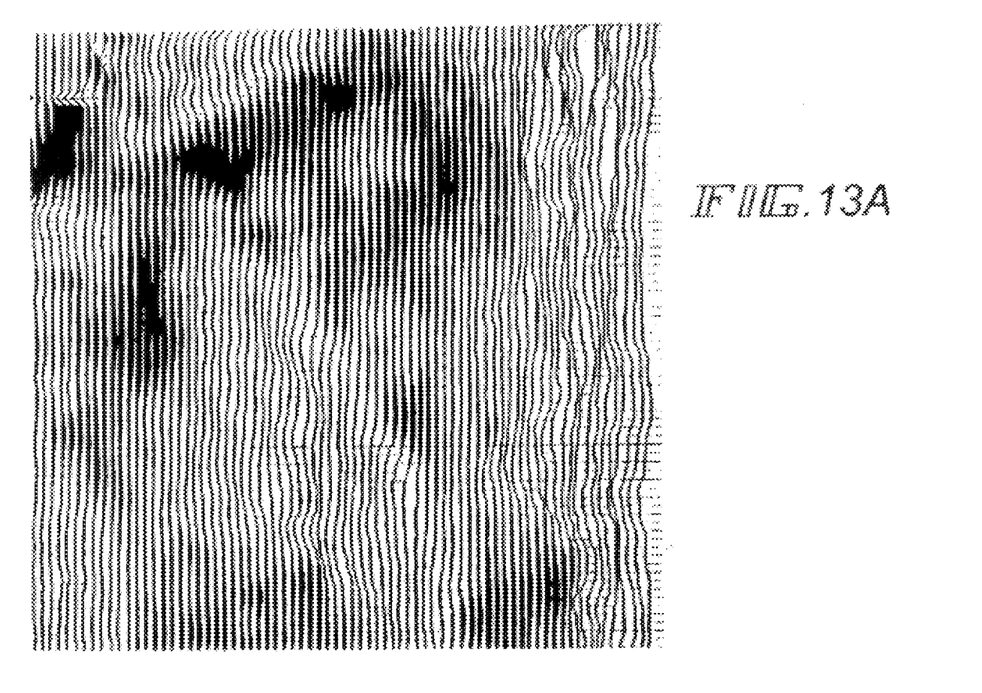
FIG. 13A is the representation of FIG. 12A repeated for purposes of comparison.
Figure 13B:
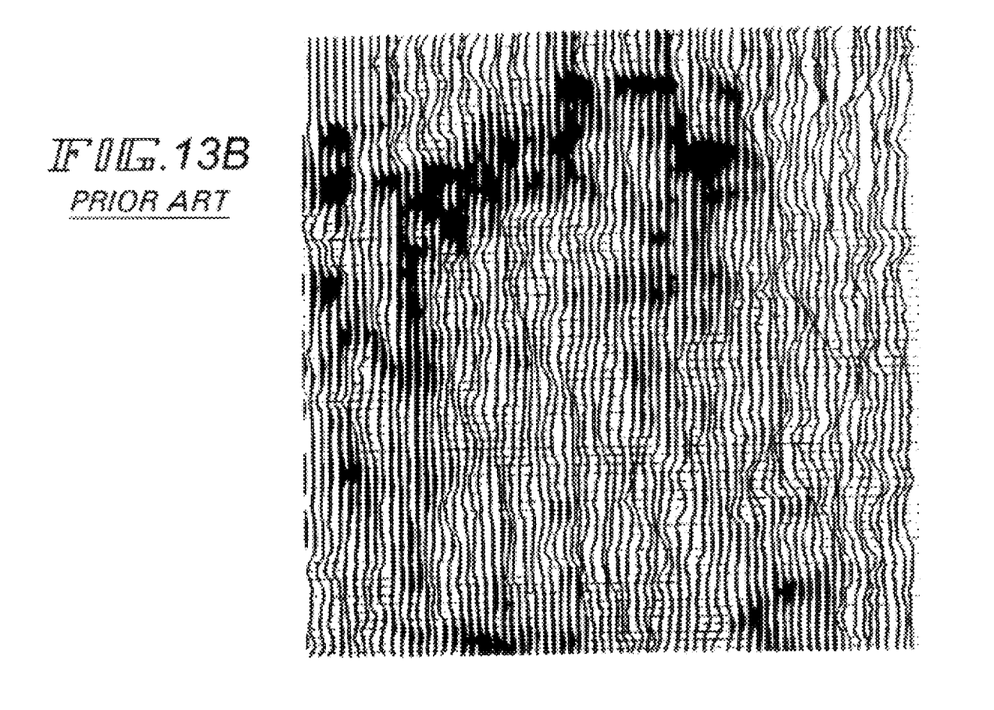
FIG. 13B is a "time slice" of a stacked section from the 3D volume produced with the conventional patch geometry of the prior art using standard cross-line spacings of 350 m×350 m.

Similar results can be seen in the "time slices" through the 3D volumes of FIGs. 12A, 12B, 13A and 13B. The "time slice" produced with the patch geometry of the present invention using a 140 m×70 m grid as shown in FIG. 12A closely approximates the corresponding "time slice" using the full patch grid as shown in FIG. 12B. In contrast, the time slice produced with the conventional patch geometry of the prior art using standard cross-line spacings of 350 m×350 m as shown in FIG. 13B exhibits linear acquisition footprints that distort the edges of geological features and noise contamination.

Figure 14A:
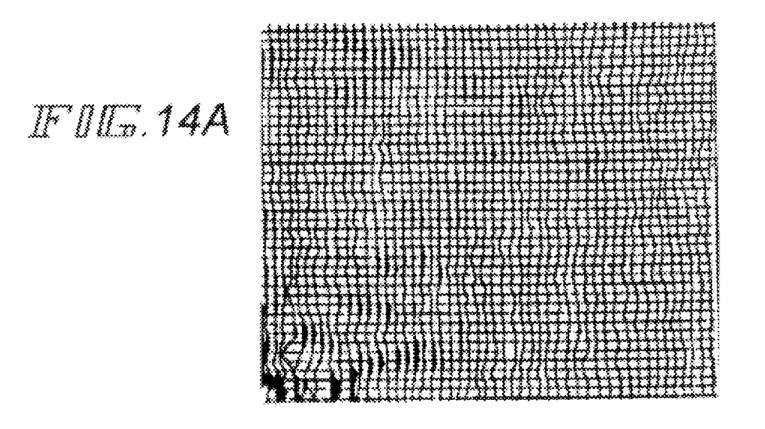
FIG. 14A is a "differenced time slice" of a stacked section from the 3D volume produced by subtracting the results obtained by the patch geometry of the present invention using a 140 m×70 m grid from the results obtained by a full patch geometry using cross-line spacings of 70 m×70 m.
Figure 14B:
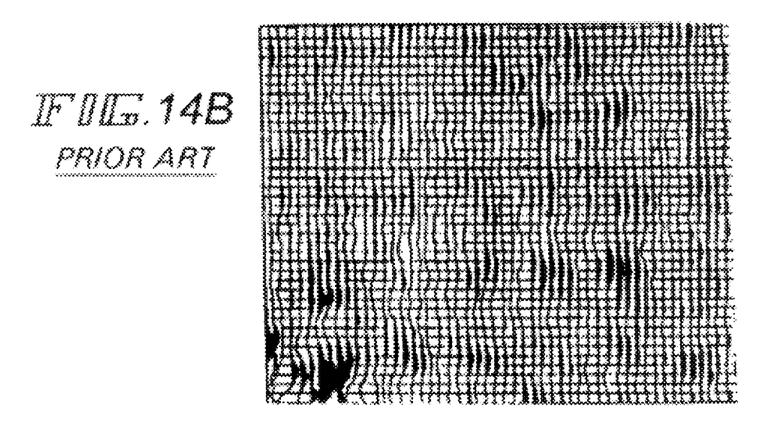
FIG. 14B is a "differenced time slice" of a stacked section from the 3D volume produced by a subtracting the results obtained by the patch geometry of the prior art using standard cross-line spacings of 280 m×280 m from the results obtained by a full patch geometry using cross-line spacings of 70 m×70 m.
Figure 14C:
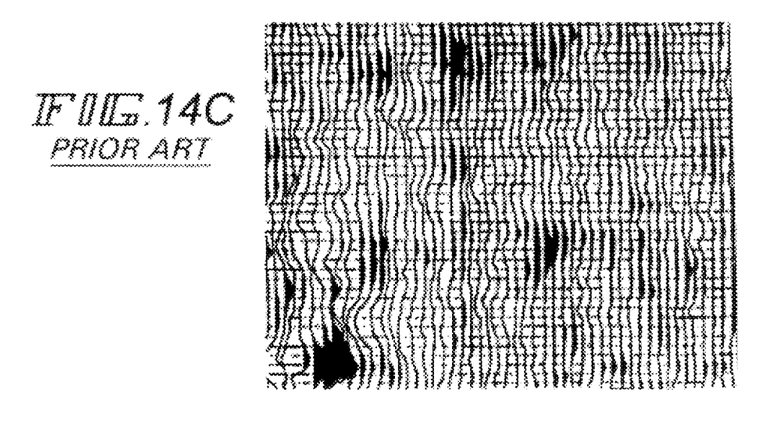
FIG. 14C is a "differenced time slice" of a stacked section from the 3D volume produced by subtracting the results obtained by the conventional patch geometry of the prior art using standard cross-line spacings of 350 m×350 m from the results obtained by a full patch geometry using cross-line spacings of 70 m×70 m.

Similar results can be seen from the difference time slices through the 3D volumes of FIGS. 14A, 14B and 14C. The difference time slices for the conventional orthogonal patch geometry using 280 m cross-spreads (FIG. 14B) and 350 m crossspreads (FIG. 14C) show significant acquisition footprint and noise contamination as compared to the results for the present invention shown in FIG. 14A.

"Full patch" results come at a severe cost penalty and are impractical in the field. In contrast, the patch geometry of the present invention comes within about 10-15% of the cost of the industry standard coarse line cross-spread. These costs, for additional equipment and a high capacity channel recording system, can be offset by an approximately 20% reduction in the perimeter area for fold build up. Other operational advantages include simplified, confined shot and receiver skids for improved efficiency. Compared to the equivalent coarse line cross-spread of 240 m×240 m line spacings and 60 m×60 m station spacings, the layout of FIG. 2 has the same linear access length per sq. km and no increase in the more expensive shot density, but with significantly improved fold and regular offset/azimuth mix.

Those skilled in the art will appreciate that with the present invention, there is an opportunity to record 3D multi component elastic wave data by relaxing both orthogonal bin dimensions to double the nominal standard spacings, thereby providing one extra channel per receiver station for horizontal geophone shear motion detection.

The embodiments of the invention in which an exclusive property or privilege is claimed are defined as follows:

1. A method of three-dimensional seismic acquisition comprising:

(a) providing a plurality of substantially parallel source/receiver lines, each said source/receiver line comprising a linear array of seismic energy receivers at substantially equally spaced station intervals and a linear array of seismic energy sources located at each second station or at each station, adjacent source/receiver lines being spaced apart by two station intervals;

(b) initiating a seismic disturbance from one of said sources;

(c) receiving seismic energy at receivers disposed about said source reflected from sub-surface bin areas, each bin centred about a common mid-point between said source and one said receiver and having dimensions of one-half by one station intervals;

(d) converting said received energy into electrical signals;

(e) repeating steps (b) to (d) and prestack processing said signals into stacked traces from common bins;

(f) associating said stacked traces from each bin with a smaller bin centred about the common mid-point and having dimensions of one-half by one-half station intervals;

(g) post-stack processing said stacked traces to produce wavefield reconstructed traces and associating said wavefield reconstructed traces with smaller bins with which said stacked traces have not been associated;

(h) displaying said stacked and wavefield reconstructed traces.

2. The method of claim 1 wherein sources within each source/receiver line are located at each second station and in adjacent lines are orthogonally aligned.

3. The method of claim 1 wherein sources within each source/receiver line are located at each second station and in adjacent lines are diagonally staggered by one station interval.

4. The method of claim 1 wherein said post-stack processing includes wavefield reconstruction by F-X prediction and three-dimensional migration.

* * * * *